United States Patent [19]

Takeda et al.

[11] Patent Number: 4,489,019
[45] Date of Patent: Dec. 18, 1984

[54] METHOD FOR PRODUCING A LONGITUDINAL MOLDING WITH NONUNIFORM SECTIONS

[75] Inventors: Shinji Takeda, Toyota; Nobutoshi Hase, Nishio, both of Japan

[73] Assignee: Aisin Seiki Kabushiki Kaisha, Kariya, Japan

[21] Appl. No.: 448,343

[22] Filed: Dec. 9, 1982

[30] Foreign Application Priority Data

Dec. 22, 1981 [JP] Japan .................. 56-207336
Dec. 22, 1981 [JP] Japan .................. 56-207337

[51] Int. Cl.³ ............................. B29H 5/26
[52] U.S. Cl. .................... 264/26; 264/248; 264/259; 264/DIG. 46
[58] Field of Search ......... 264/26, 248, 259, 271.1, 264/279, 279.1, DIG. 46

[56] References Cited

U.S. PATENT DOCUMENTS

| 3,289,253 | 12/1966 | Buonaiuto | 264/26 |
| 3,444,275 | 5/1969 | Willett | 264/26 |
| 3,488,411 | 1/1970 | Goldman | 264/26 |
| 3,897,967 | 8/1975 | Barenyl | 293/1 |
| 4,298,324 | 11/1981 | Soulier | 264/26 |
| 4,308,224 | 12/1981 | Becker | 264/26 |

FOREIGN PATENT DOCUMENTS 722620 1/1955 United Kingdom .
1003019 9/1965 United Kingdom .

*Primary Examiner*—Lorenzo B. Hayes
*Assistant Examiner*—W. Thompson
*Attorney, Agent, or Firm*—Oblon, Fisher, Spivak, McClelland & Maier

[57] ABSTRACT

Decorative moldings with non-uniform sections made of thermoplastic resin are produced by remolding. The material to be remolded is formed by cutting an extruded rod or combining an extruded rod with other parts and being placed in a mold. The material in the mold is heated and partially fused by high frequency dielectric heating. Then the fused portion of the material is cooled in the mold so that the material is partially remolded.

7 Claims, 22 Drawing Figures

FIG. 4
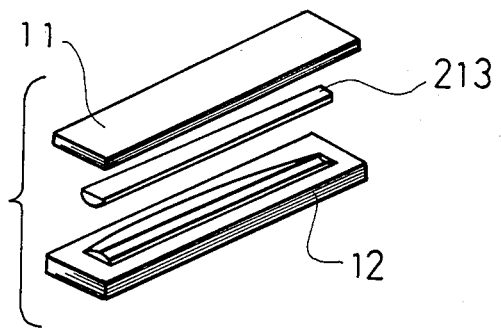
FIG. 5
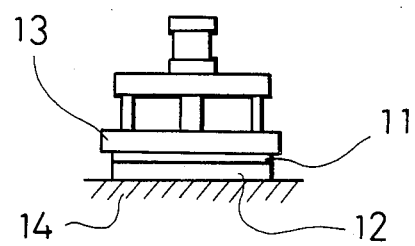
FIG. 6
FIG. 6(a)
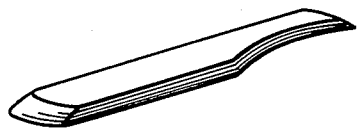
FIG. 6(b)
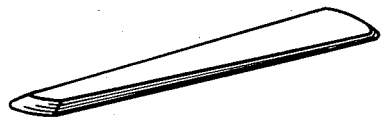
FIG. 6(c)
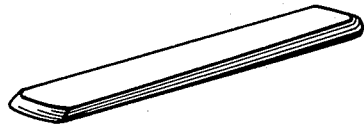
FIG. 6(d)

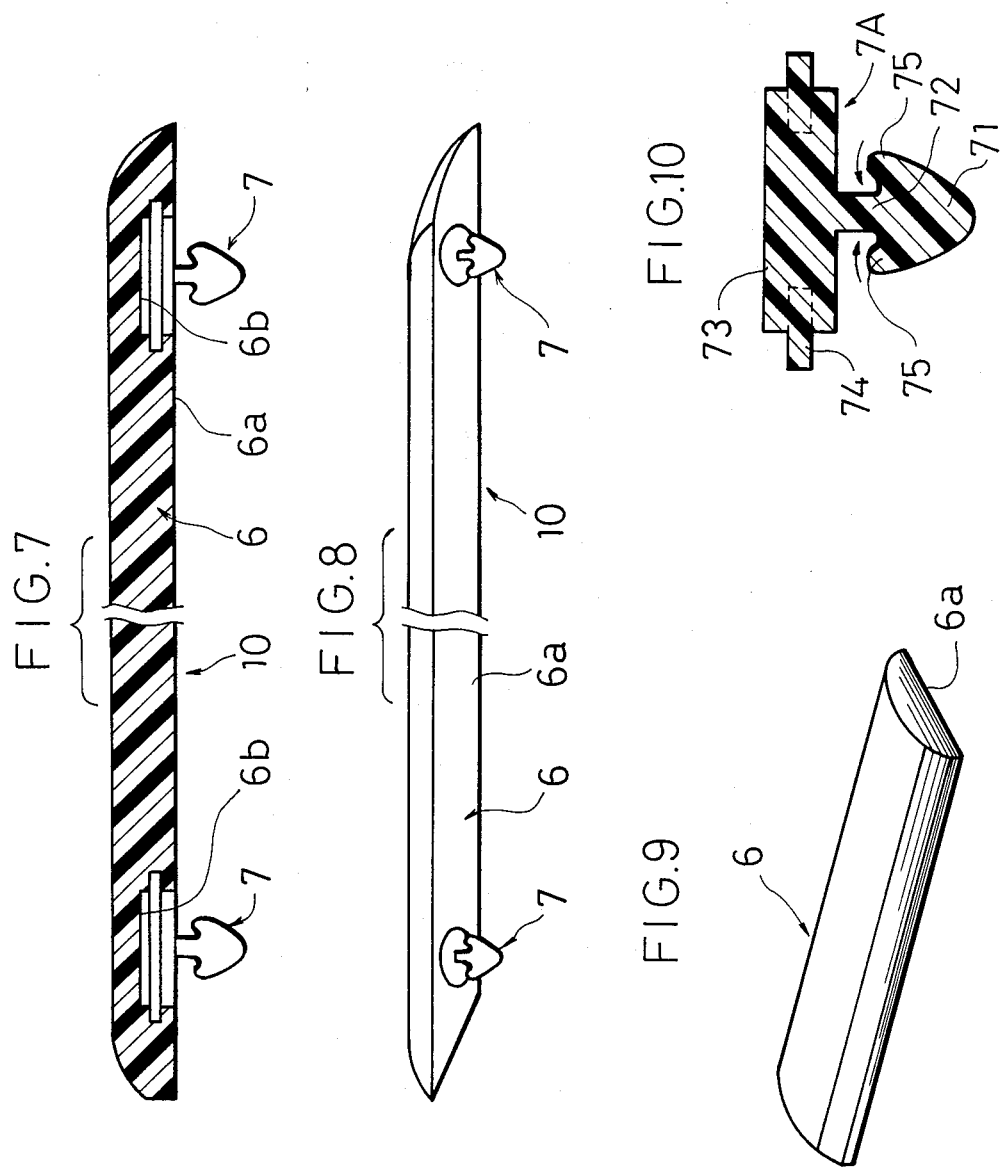

METHOD FOR PRODUCING A LONGITUDINAL MOLDING WITH NONUNIFORM SECTIONS

BACKGROUND OF THE INVENTION

The present invention relates to a decorative molding composed of thermoplastic resin and having a longitudinal shape with nonuniform sections. The molding is mainly used as the outer decoration of an automobile.

DESCRIPTION OF THE PRIOR ART

Decorative moldings for automobiles have been conventionally fabricated by either extrusion molding or injection molding.

A molding with a uniform section can only be formed by extrusion molding, but a molding with nonuniform sections or a molding with attached clips can hardly be formed by this method.

On the contrary, the injection molding method can be used to make moldings with either uniform or nonuniform sections as well as those with clips. However, this method has serious disadvantages, such as extremely high cost in obtaining injection molding machines and molding dies and prolonged time needed for die fabrication.

SUMMARY OF THE INVENTION

It is therefore a primary object of the present invention to provide a decorative molding having a longitudinal shape with nonuniform sections without the use of an injection molding machine.

It is another object of the present invention to provide a molding with nonuniform sections by reshaping a longitudinal body with a uniform section.

It is another object of the present invention to provide a molding with clips by combining a longitudinal molding with clips.

Accordingly, the invention employs a high-frequency molding machine for producing moldings with nonuniform sections.

BRIEF DESCRIPTION OF THE DRAWINGS

These and other objects of the invention will be seen by reference to the description, taken in connection with the accompanying drawings, in which:

FIG. 4 is an exploded view of a mold in which the longitudinal body shown in FIG. 3 (b) is remolded, FIG. 5 is a front elevational view of the high-frequency molding machine, FIGS. 6 (a)-(d) are perspective views of the molding of thermoplastic resin according to the present invention, produced by the high-frequency molding machine, FIG. 7 is a sectional view of a molding with attached clips of thermoplastic resin, FIG. 8 is a perspective view of the molding similar to FIG. 7, FIG. 9 is a perspective view illustrating a longitudinal body with a uniform section, FIG. 10 is a vertical sectional view showing a clip.

DETAILED DESCRIPTION OF THE PREFERRED EMBODIMENTS

Figure 1:
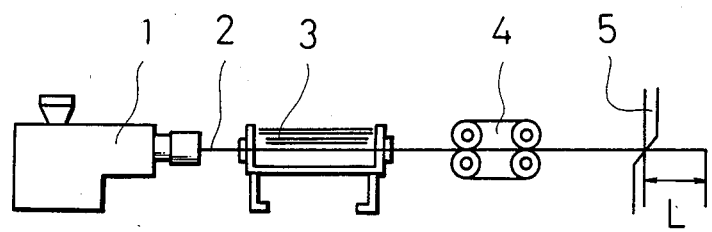
FIG. 1 is a flow diagram illustrating the process for producing a molding by extrusion molding.

The molding with nonuniform sections of the present invention comprises at least two parts: one part of which formed by extrusion molding and occupies almost the whole part of the molding, and the other part of which is remolded or combined to said one part in the mold when fused by high-frequency heating. The remolded part may be an end portion, a surface portion or a projected portion of the molding. The part combined with the main portion of the molding may be a clip which fastens the molding onto the surface of another body such as the body of an automobile.

The method for producing the molding of the present invention comprises the step of placing at least one longitudinal thermoplastic body into a mold, partially heating the body to be partially fused by high-frequency dielectric heating and cooling the melted part in the mold so as to remolded. The longitudinal body is made of a rod with a uniform section produced by the conventional extrusion molding. The shape of the cylindrical body is formed by cutting the extruded rod according to the shape of the molding, such as a square or semicircle. According to the molding to be produced, a plurality of longitudinal bodies can be placed in the mold. Sheets, lumps or molded parts of resin, such as clips, are placed together with the longitudinal body in the mold. The total volume of the whole material placed in the mold is preferably equal to be volume of the cavity of the mold. However, a slight difference is permitted especially in a mold made of resin such as silicon. On the other hand, some portion of a longitudinal body may be placed in the cavity of a mold. For example, one of the edge portions of a longitudinal body can be inserted into the cavity of a mold and remolded by high-frequency dielectric heating. In order to fix a clip on the back surface of a longitudinal body, some portion of the back surface of the longitudinal body and the clip can be appropriately placed in the cavity and heated so that the resin in contact may be partially melted and the clip welded to the back portion of the longitudinal body.

The thermoplastic resin used for the present invention preferably has a large dielectric loss factor and is easily heated by high-frequency dielectric heating. Such resins are, for example, polyacetal, polyvinyl chloride, polybutylene terephtalete and polyester, which have a large dielectric loss factor so that such can be easily heated by high-frequency heating.

When a plurality of parts of resin are placed in a mold, at least one of the thermoplastic resins should have a large dielectric loss factor.

The thermoplastic resins comprising both said parts should have good affinity to each other so that they may be easily welded together. To be welded firmly, it is preferable that the all parts of the molding are composed of the same kind of resin. However, to preserve the shape of some parts such as clips, it may be preferable that the parts are composed of a resin less heatable than the longitudinal body.

In these cases, it is preferable for easier bonding to mount a bonding member composed of easily heatable and meltable thermoplastic resin onto one of the parts. The longitudinal body is also preferred to have a cavity, into which the base portion of the parts is inserted.

When remolded by the high-frequency dielectric heating, the mold is placed between the electrodes where the high-frequency alternating voltage is induced. By the high-frequency voltage, functional groups and molecules of the resin are oscilated so that they get heated by the frictional heat between them. The whole resin within the mold may be heated, but it is preferable that the electrodes are set such that only the necessary portions are heated so as to be fused.

In the case when clips are bonded to a longitudinal body, it is necessary to preserve the shape of the heads of the clips. Thus, the heads of the clips must be placed sufficiently apart from the space between the electrodes. One preferred method for this purpose is to form a cavity somewhere on the electrode, where the head of a clip is placed, in order to protect the head from being heated.

Another method to keep the shape of the clips is to heat the clip in a mold made of silicon resin that has a low dielectric loss factor. In this case, the head is remolded in the mold even through it is once heated and melted in the mold.

The mold used for the present invention is preferably made of material that has a low dielectric loss factor, such as silicon resin, or a ceramic. Some portion of the surface of the electrodes of a high-frequency molding machine may be used as a portion of the surface of the mold. In this process, the pressing is not indispensable. After the desired portion is sufficiently fused, it is stopped to be heated and is cooled within the mold. This results a molding having the fitted surface with the mold. Thus, the molding with nonuniform sections can be formed.

EXAMPLE 1

Figure 2:
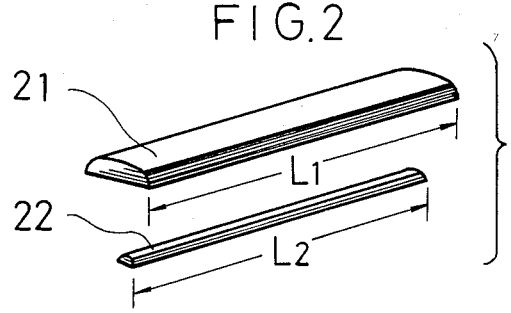
FIG. 2 is a perspective view of the extruded products of thermoplastic resin, produced by extrusion molding.

Now the methods for producing four longitudinal moldings shown in FIG. 6 are described. At first, two kinds of extruded rods 21 and 22 shown in FIG. 2 are produced by a process shown in FIG. 1. Namely an extruded rod 2 of a thermoplastic resin such as polyvinyl chloride is formed by an extrusion molding machine 1 and successively extruded. It is cooled by water in a refrigerative tank 3, then moved through conveying equipment 4, and reaches a cutter 5 which severs the rod at the predetermined length L.

The extruded rod 21 has a shape of a long plate with a length of L1 and a relatively broad width. On the other hand, the extruded rod 22 has a shape of a thin stick with a length of L2.

Next, the longitudinal bodies as shown in FIGS. 3 (a)-(d) are prepared. A longitudinal body 211 is formed by cutting out the portion 212 from the extruded rod 21 as shown in FIG. 3 (a). Similarly, longitudinal bodies 213 and 215 are formed by cutting out the portions 214 and 216 respectively as shown in FIGS. 3 (b) and (c). As in FIG. 3 (d), the two extruded rods are used as the longitudinal bodies 21 and 22.

Then, each of the longitudinal bodies 211,213, 216,21 and 22 is placed respectively in each corresponding mold. For example, FIG. 4 shows a mold which is composed of an upper member 11 and a lower member 12. Both upper and lower members 11 and 12 are made of silicon resin. This mold is used to remold the longitudinal body 213. Each of the other longitudinal bodies 211 and 216 is placed in a different mold, respectively. The longitudinal bodies 21 and 22 are placed together in another mold. Each mold is respectively set between an upper plate 13 and a lower plate 14 which are the electrodes of a high frequency molding machine. Then each of the longitudinal bodies are heated in each of the molds by inducing a high-frequency voltage to the electrodes. The heated portions of the longitudinal bodies are melted and flow along the surface of the cavity of each of the molds. At this stage, the heating is stopped and the melted portions are cooled. The cooling may be accomplished by imparting cooling water into the electrodes.

Figure 3A:
FIGS. 3 (a)-(d) are exploded views of longitudinal bodies to be remolded, which are made by cutting or being combined with the extruded products shown in FIG. 2.
Figure 3B:
Figure 3C:
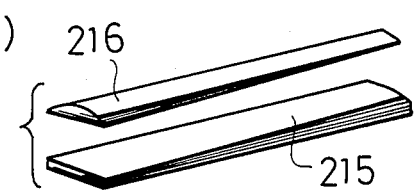
Figure 3D:
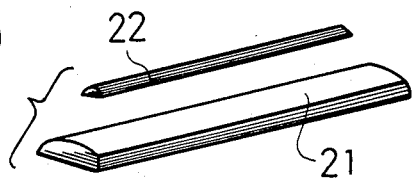

Finally, reshaped moldings shown in FIG. 6(a)-FIG. 6(d) are produced: the molding shown in FIG. 6(d) is made of the longitudinal bodies 21 and 22 shown in FIG. 3(d). These four moldings have smooth surfaces with a beautiful gloss and can be used as a decorative molding of an automobile.

EXAMPLE 2

FIG. 7 and FIG. 8 illustrate a decorative molding 10 according to the present invention, which comprises a longitudinal body member 6 made of thermoplastic resin and a plurality of clips 7 made of thermoplastic resin.

The body member 6 of the molding is shown in FIG. 9 and which has a constant sectional shape. The body member 6 is generally extrusion molded but is not limited to the extruded moldings. The body member 6 is formed with holes 6b, in which the base portion of clips are inserted, by piercing the lower surface 6a of the body member. The holes 6b are not always necessary. When the body member and the clips are made of the same material, they are easily welded together so the clips can be attached directly to the surface of the body.

Figure 11:
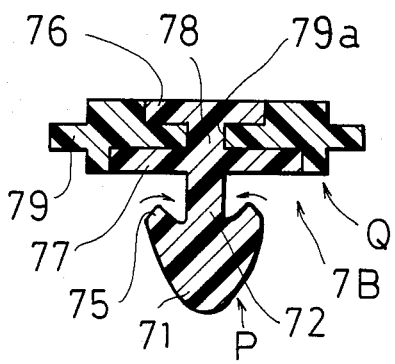
FIG. 11 is a similar view to FIG. 10, but which illustrates another clip.
Figure 12:
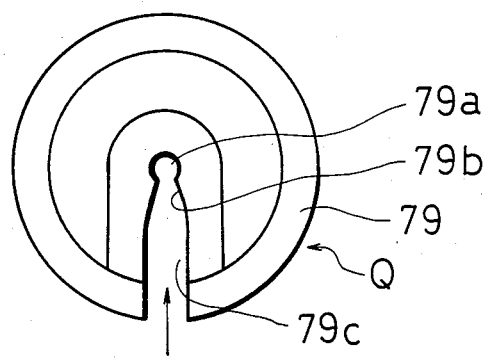
FIG. 12 is a plan view showing the joining member of the clip shown in FIG. 11.

FIG. 10 and FIG. 11 illustrate the sectional views of the clips 7. The clip 7A shown in FIG. 10 is an integrally molded clip made of the same material or a material different from the material of the body member. The bond strength between the body member and the clip is a little weaker when they are made of different materials as compared with those made of the same material. The body member is generally made of resins such as polyvinyl chloride or polyacetal. The clip 7A consists of an approximately triangular head part 71, extending downwards, a cylindrical shaft 72, a cylindrical base member 73, and a brim 74. The circumference 75 of the bottom of the triangular head part 71 is elastic and able to bend in the direction of the arrow. The clip 7B shown in FIG. 11 is combined with joining member Q. The same reference numerals are used for the same shaped parts as in FIG. 10. The base of the clip P has a construction wherein a small circular disk 76 is combined with a large circular disk 77 at a shaft 78. The joining member Q is ring-shaped and is provide with a slot 79C from the circumference to the center, as shown in the plan view of FIG. 6. The shaft 78 of the clip P is inserted into this slot 79C in the direction of the arrow. The shaft is pushed through the contracted part 79b, which is then expanded and placed in the center hole 79a as shown in FIG. 11. In this position, the shaft is perfectly joined to the joining member Q, so it will not come off in the opposite direction of the arrow. The circumference 75 of the bottom of this triangular head part 71 is also elastic, and is similar to the clip 7A shown in FIG. 10. The thermoplastic resin which forms the joining member Q is preferred to be heated by high-frequency heating more easily than the resin forming the clip P, and more preferably it is the same kind of resin as that which constitutes the body member.

The brim 79 projects outwards as shown in FIG. 10 and FIG. 11, but it is allowed to form a concave portion as shown by the lines in FIG. 10. In this case, when heated by a high-frequency molding machine, the resin of the body member is melted and flows into the concave portion, and thus the body member and the clips are combined together.

Figure 13:
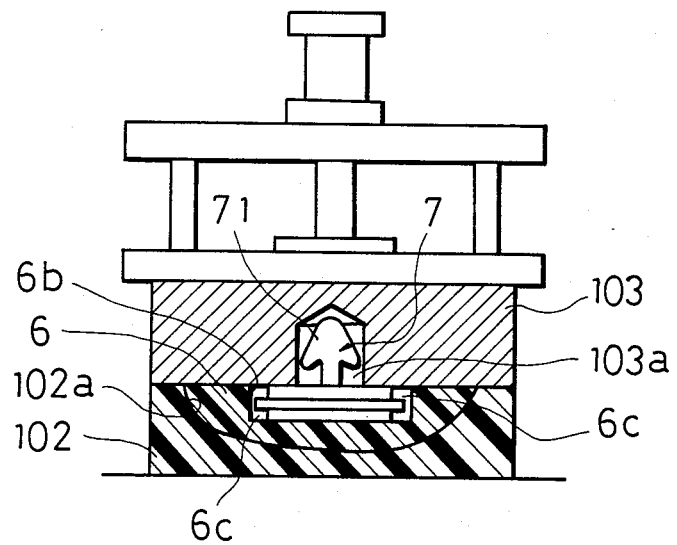
FIG. 13 is a vertical sectional view showing the process of the high-frequency molding.
Figure 15:
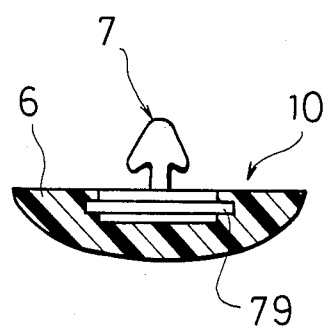
FIG. 15 is a sectional view of a molding with attached clips produced by high-frequency molding.

Next, the process will be described to bond the clips 7 into the holes 6b of the body member. As shown in FIG. 13, the body member 6 is set in the cavity 102a of the lower mold 102 made of silicon rubber and the clips 7 are set in a plurality of holes 6b of the body member. Then, an electrode 103 made of metal is placed so as to cover the clips. The electrode 103 has a hollow portion 103a large enough to allow entry of the triangular head part 71 of the clip 7. After this, the assembly is set in a high-frequency molding machine and then heated. By the heating described above, the body member 6 and the bonding member 79 are integrally heated and fused, so that the fused resin may fill the gap 6c between the hole 6b and clip 7. Thus, the body member 6 and the clip 7 are firmly bonded together, as shown in FIG. 15. When the body member 6 and the clip 7 are of different materials, the body member 6 and the adjacent bonding member 79 will be melted to fill the gap. When they are of the same material, the surfaces of both of them will be melted to bond them together.

Figure 14:
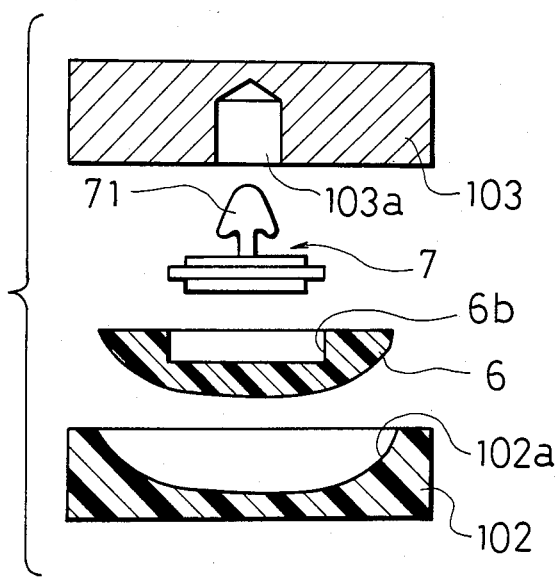
FIG. 14 is an exploded view showing some of the construction parts of FIG. 13.

FIG. 14 shows individual members of the construction shown in FIG. 13. In the above description of the example, the holes 6b are disposed in the body member 6, but the holes are not always necessary. For example, the base portion of the clips may be pressed into and burried in the fused portion of the body member. Moreover both surface portion of the base portion of the clips and the body member may be melted and bonded to each other. Both methods provide firm bonding enough for practical use.

In this example, the clip set in the body member is heated by a high-frequency molding machine to melt the resin for bonding the clip and the body. Therefore, by this method, a decorative molding which has either nonuniform sections or a uniform section can be produced at a considerably lower cost than by conventional injection molding. Although even in this method which employs a high-frequency molding machine, there is a need to make a mold, the fabrication cost of the mold is far lower than that necessary for injection molding. Additionally the mold can be produced in a shorter time.

What is claimed is:

1. A method for forming a molding, which comprises:
   forming at least one longitudinal body made of thermoplastic resin, which comprises a main part of a resulting molding;
   placing said longitudinal body in a mold;
   high frequency dielectric heating said longitudinal body in said mold until at least a surface portion of said longitudinal body is melted by said high frequency dielectric heating; and
   cooling said longitudinal body in said mold so as to produce a partially reshaped molding.

2. A method for forming a molding, which comprises:
   forming at least one longitudinal body made of thermoplastic resin, which comprises a main part of a resulting molding;
   placing said longitudinal body in a mold;
   high frequency dielectric heating said longitudinal body in said mold until at least a surface portion of said longitudinal body is melted by said high frequency dielectric heating;
   cooling said longitudinal body in said mold so as to produce a partially reshaped molding; and
   cutting said longitudinal body prior to placing said body in said mold.

3. A method for forming a molding, which comprises:
   forming at least one longitudinal body made of thermoplastic resin, which comprises a main part of a resulting molding;
   placing said longitudinal body in a mold;
   high frequency dielectric heating said longitudinal body in said mold until at least a surface portion of said longitudinal body is melted by said high frequency dielectric heating;
   cooling said longitudinal body in said mold so as to produce a partially reshaped molding; and
   placing at least one chip member in said mold with said body and connecting said at least one chip member to said body by said high frequency dielectric heating.

4. A method according to claim 1, wherein said mold further comprises a mold having a low dielectric loss factor.

5. A method for forming a molding, which comprises:
   forming at least one longitudinal body made of thermoplastic resin, which comprises a main part of a resulting molding:
   placing said longitudinal body in a mold;
   high frequency dielectric heating said longitudinal body in said mold until at least a surface portion of said longitudinal body is melted by said high frequency dielectric heating; and
   cooling said longitudinal body in said mold so as to produce a partially reshaped molding wherein said mold further comprises silicon resin.

6. A method according to claim 1, wherein said thermoplastic resin further comprises a resin having a high dielectric loss factor.

7. A method for forming a molding, which comprises:
   forming at least one longitudinal body made of thermoplastic resin, which comprises a main part of a resulting molding;
   placing said longitudinal body in a mold;
   high frequency dielectric heating said longitudinal body in said mold until at least a surface portion of said longitudinal body is melted by said high frequency dielectric heating; and
   cooling said longitudinal body in said mold so as to produce a partially reshaped molding wherein the thermoplastic resin further comprises a resin selected from the group consisting of polyvinyl chloride, polyacetal and polyester.

* * * * *